United States Patent [19]

Roscoe

[11] 4,282,961
[45] Aug. 11, 1981

[54] FAN DRIVE WITH TORQUE TRANSMITTING DEVICE

[75] Inventor: Charles S. Roscoe, Battle Creek, Mich.

[73] Assignee: Eaton Corporation, Cleveland, Ohio

[21] Appl. No.: 71,223

[22] Filed: Aug. 30, 1979

[51] Int. Cl.³ .................... F16D 35/00; F16D 43/25
[52] U.S. Cl. ............................ 192/58 B; 192/82 T
[58] Field of Search ............ 192/58 B, 82 T; 251/11; 137/79; 73/363.7; 123/41.12; 236/101 D

[56] References Cited

U.S. PATENT DOCUMENTS

| 106,820 | 8/1870 | Hopkins et al. | 73/363.7 X |
|---|---|---|---|
| 2,248,672 | 7/1941 | Holmes | 73/363.7 X |
| 2,546,423 | 3/1951 | Bentsen | 73/363.7 X |
| 3,055,473 | 9/1962 | Oldberg et al. | 192/58 B |
| 3,144,922 | 8/1964 | Weir | 192/58 B |
| 3,512,622 | 5/1970 | Sutaruk | 192/58 B |
| 3,949,849 | 4/1976 | Hammer | 192/58 B |
| 3,968,866 | 7/1976 | Leichliter et al. | 192/58 B |
| 3,972,399 | 8/1976 | Bopp | 192/58 B |
| 4,051,936 | 10/1977 | Crisenbery et al. | 192/58 B |
| 4,111,289 | 9/1978 | Brummett | 192/58 B |

*Primary Examiner*—Rodney H. Bonck

*Attorney, Agent, or Firm*—R. J. McCloskey; J. Yakimow; M. L. Union

[57] ABSTRACT

A torque transmitting device is adapted to transmit torque from an input (32) and includes a first member (14), a second member (16) rotatable relative to the first member about an axis of rotation (24), an operating chamber (18) disposed in the first member, a fluid reservoir (70), a fluid passageway (74) communicating with fluid reservoir in the operating chamber and a valve member (82) for controlling the fluid flow through the fluid passageway. A fluid is disposed in the reservoir and is selectively displaceable into the operating chamber through the fluid passageway whereby fluid is positioned in the operating chamber to transmit energy through the fluid from one of the members to the other. A thermostatic ring (90) is connected to the valve member for controlling the position of the valve member and the volume of the fluid in the operating chamber in response to the ambient temperature of the torque transmitting device. A bolt member (36) is provided for mounting the torque transmitting device to the shaft of an engine. The bolt member extends through the first and second members substantially coaxial to the axis of rotation and supports the first and second members for rotation.

21 Claims, 2 Drawing Figures

FAN DRIVE WITH TORQUE TRANSMITTING DEVICE

BACKGROUND OF THE INVENTION

1. Field of the Invention

The present invention relates to a torque transmitting device for a vehicle and more particularly to a torque transmitting fan drive assembly having a thermostatic ring connected to a valve member for controlling the position of the valve member to vary the volume of torque transmitting fluid in an operating chamber in the coupling in response to the ambient temperature of the torque transmitting device, and wherein a bolt member extends coaxial to the axis of rotation for supporting the torque transmitting device on a shaft of an engine associated with the vehicle. Additionally, a counterbalancing means is provided responsive to centrifugal force acting thereon upon rotation thereof to counterbalance the centrifugal forces acting on the thermostatic ring upon rotation of the thermostatic ring.

2. Background of the Invention

There are many known torque transmitting fan drives in the prior art. Some of these fan drives, such as illustrated in the Sutaruk U.S. Pat. No. 3,512,622, disclose the use of a through bolt coaxially disposed for supporting the torque transmitting mechanism on an engine shaft. However, the bimetal valve of Sutaruk in the through bolt design is responsive to the internal temperature of the fan drive and not the temperature of the ambient air around the fan drive. Preferably, the fan drive acts to blow cooling air over the radiator of a vehicle. The air passing over the radiator and through the fan drive has an ambient temperature which is indicative of the temperature of the water in the radiator. Thus, sensing ambient air temperature allows the fan drive to be controlled in a direct relationship to the temperature of the fluid in the radiator of the vehicle. The Sutaruk design which discloses a bimetal element interiorally of the fan drive would not be responsive to the ambient air temperature but rather to the temperature of the fan drive itself which changes very slowly due to its mass. Thus, the internal temperature of the fan drive will not be directly related to the temperature of water in the radiator of the vehicle.

Another prior art fan drive disclosed in Sutaruk utilizes a thermostatic coil which senses the ambient air temperature. However, the use of the known thermostatic coil which senses ambient air temperatures prevents the use of the through bolt disposed coaxial to the axis of rotation for mounting the fan drive due to the fact that the coil is centrally mounted on the axis of rotation of the unit. In some instances, it is desirable to utilize a through bolt for mounting the fan drive unit having a temperature responsive element which is responsive to the ambient temperature of the torque transmitting device rather than the internal temperature of the torque transmitting device.

In order to solve the problem of providing a through bolt design which is responsive to the ambient temperature of air surrounding the torque transmitting unit, it has been decided to utilize a thermostatic ring which is mounted to the cover of the unit and which is disposed with its center coaxial to the axis of rotation of the unit. A through bolt can then be inserted through the central opening in the thermostatic ring and through the coupling members to secure the unit to a shaft of a vehicle engine. The use of a thermostatic ring rather than a thermostatic coil causes problems due to the centrifugal force which acts on the ring when the ring and fan drive rotate. In order to overcome this problem, a counterbalancing means has been provided to counterbalance the centrifugal force which acts on the thermostatic ring.

SUMMARY OF THE INVENTION

The present invention relates to a new and improved torque transmitting device adapted to transmit torque from an input including a first member defining an operating chamber therein, a second member disposed within said operating chamber and rotatable relative to the first member about an axis of rotation, a fluid reservoir, a fluid passageway communicating with the fluid reservoir and the operating chamber and valve means for controlling the fluid flow through the fluid passageway to effect selective communication between the fluid reservoir and the operating chamber. Fluid means is disposed in the reservoir and selectively displaceable into the operating chamber through the fluid passageway whereby fluid is positioned in the operating chamber to transmit energy from the input through the fluid from one of the members to the other. A thermostatic ring is connected to the valve member for controlling the position of the valve member in response to the ambient temperature of the torque transmitting device.

Another provision of the present invention is to provide a new and improved torque transmitting device as set forth in the preceding paragraph further including fastener means for connecting the torque transmitting device to the input and wherein the fastener means is disposed coaxial to the axis of rotation.

Still another provision of the present invention is to provide a new and improved torque transmitting device as set forth above further including counterbalancing means rotatable about the axis of rotation and responsive to centrifugal force. The counterbalancing means upon rotation thereof acts to counterbalance the centrifugal forces acting on the thermostatic ring upon rotation thereof.

A further provision of the present invention is to provide a torque transmitting device adapted to transmit torque from an input including a first member defining an operating chamber therein, a second member disposed within the operating chamber and rotatable relative to the first member about an axis of rotation, a fluid reservoir, a fluid passageway communicating with the fluid reservoir in the operating chamber, and valve means for controlling the fluid flow through the fluid passageway. Fluid means is disposed in the reservoir and selectively displaceable into the operating chamber through the fluid passageway whereby fluid is positioned in the operating chamber to transmit energy from the input through the fluid from one of the members to the other. A thermostatic element responsive to the ambient temperature of the torque transmitting device is connected to the valve member for controlling the position of the valve and the volume of the fluid means in the operating chamber. Fastener means is provided for connecting one of the first and second members to the input to effect relative rotation of the first and second members. The fastener means is disposed coaxial to the axis of rotation.

Another provision of the present invention is to provide a new and improved torque transmitting device as set forth in the preceding paragraph, further including counterbalancing means rotatable about the axis of rotation and responsive to centrifugal force. The thermostatic element is rotatable about the axis of rotation and is subjected to centrifugal force. The counterbalancing means upon rotation thereof acts to counterbalance the centrifugal forces acting on the thermostatic element upon rotation thereof.

A further provision of the present invention is to provide an engine fan drive adapted to be connected to a shaft driven by an engine including a driving clutch member connectable to the shaft for rotation therewith about an axis of rotation, a driven clutch member rotatable relative to the driving clutch member and driven thereby about the axis of rotation, fan means connected to rotate with the driven member, an operating chamber, a fluid reservoir, and operating fluid disposed in the fluid reservoir selectively displaceable into the operating chamber. First and second fluid passageways connect the operating chamber and the fluid reservoir with one of the passageways adapted to direct operating fluid flow from the reservoir to the operating chamber and the other of the fluid passageways adapted to direct operating fluid flow from the operating chamber to the fluid reservoir. A valve is provided for controlling the operating fluid flow through one of the fluid passageways and a pump means is provided effective to pump the operating fluid between the fluid reservoir and the operating chamber through the other of the fluid passageways. A temperature responsive element is provided for controlling the position of the valve in response to the ambient temperature of the engine fan drive to control the volume of fluid in the operating chamber. The operating fluid transmits energy from the engine shaft through the fluid from the driving clutch member to the driven clutch member. Each of the driving and driven clutch members includes an opening therein disposed coaxial to the axis of rotation. A bolt member having a longitudinal axis coaxial to the axis of rotation extends through the opening in each of the driving and driven members to support the driving and driven members on the shaft driven by the engine.

DESCRIPTION OF THE PREFERRED EMBODIMENT

The present invention provides a reliable fluid coupling having relatively rotatable input and output coupling members and in which a fluid shear medium between the coupling members transmit torque from the input coupling member to the output coupling member when the input coupling member is driven. The transmission of torque can be through viscous shear or hydromechanical coupling of a fluid medium in an operating chamber. The fluid coupling embodying the present invention is suitable to couple various driving units to units to be driven thereby and is particularly suitable for coupling a vehicle motor to various accessories therefor such as the water pump, radiator fan, etc.. Accordingly, the various fluid coupling embodiments, representing preferred embodiments of the invention, will be described as driving vehicle accessories, more particularly, the radiator fan.

Figure 1:
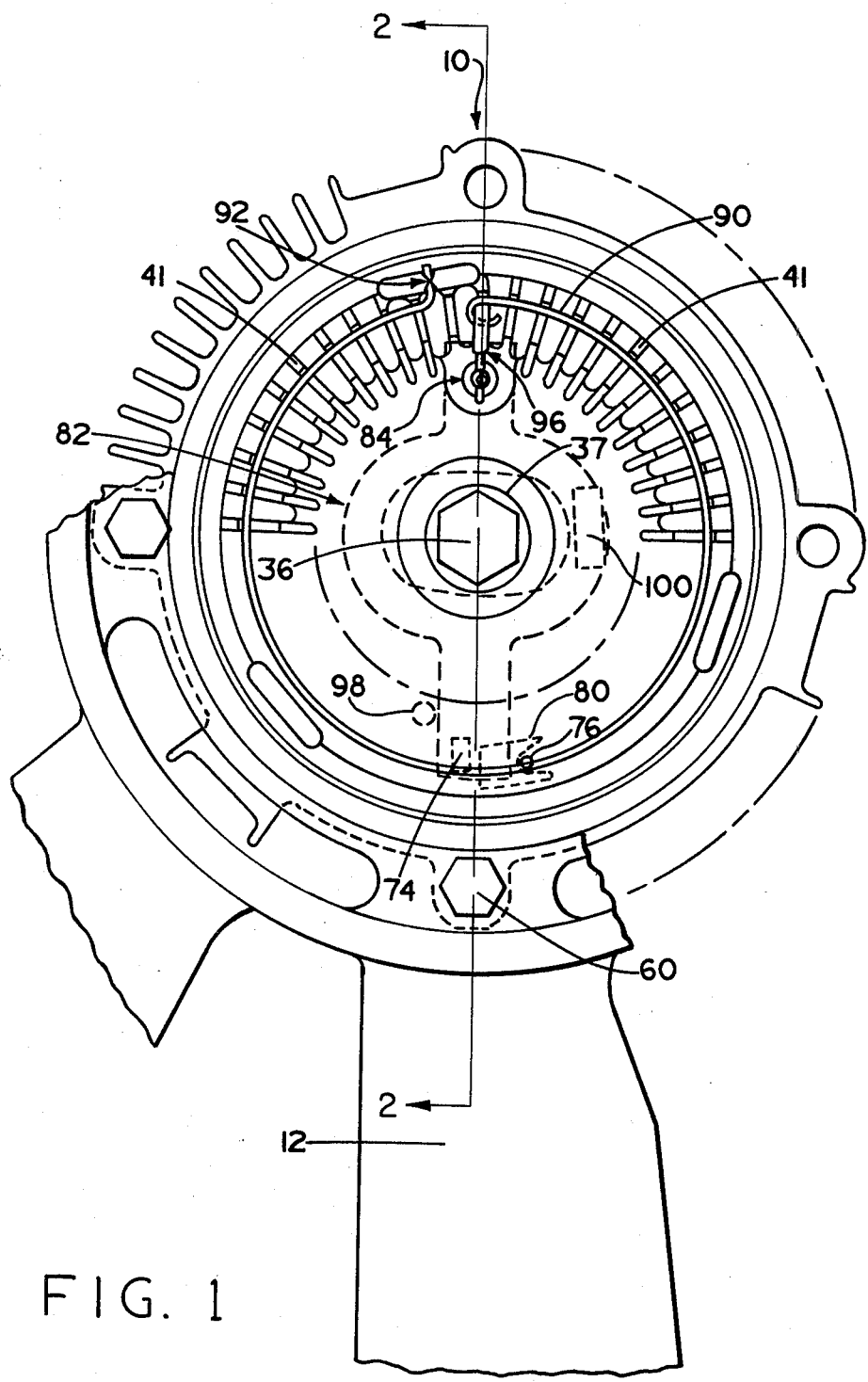
FIG. 1 is a front view of the torque transmitting device of the present invention.
Figure 2:
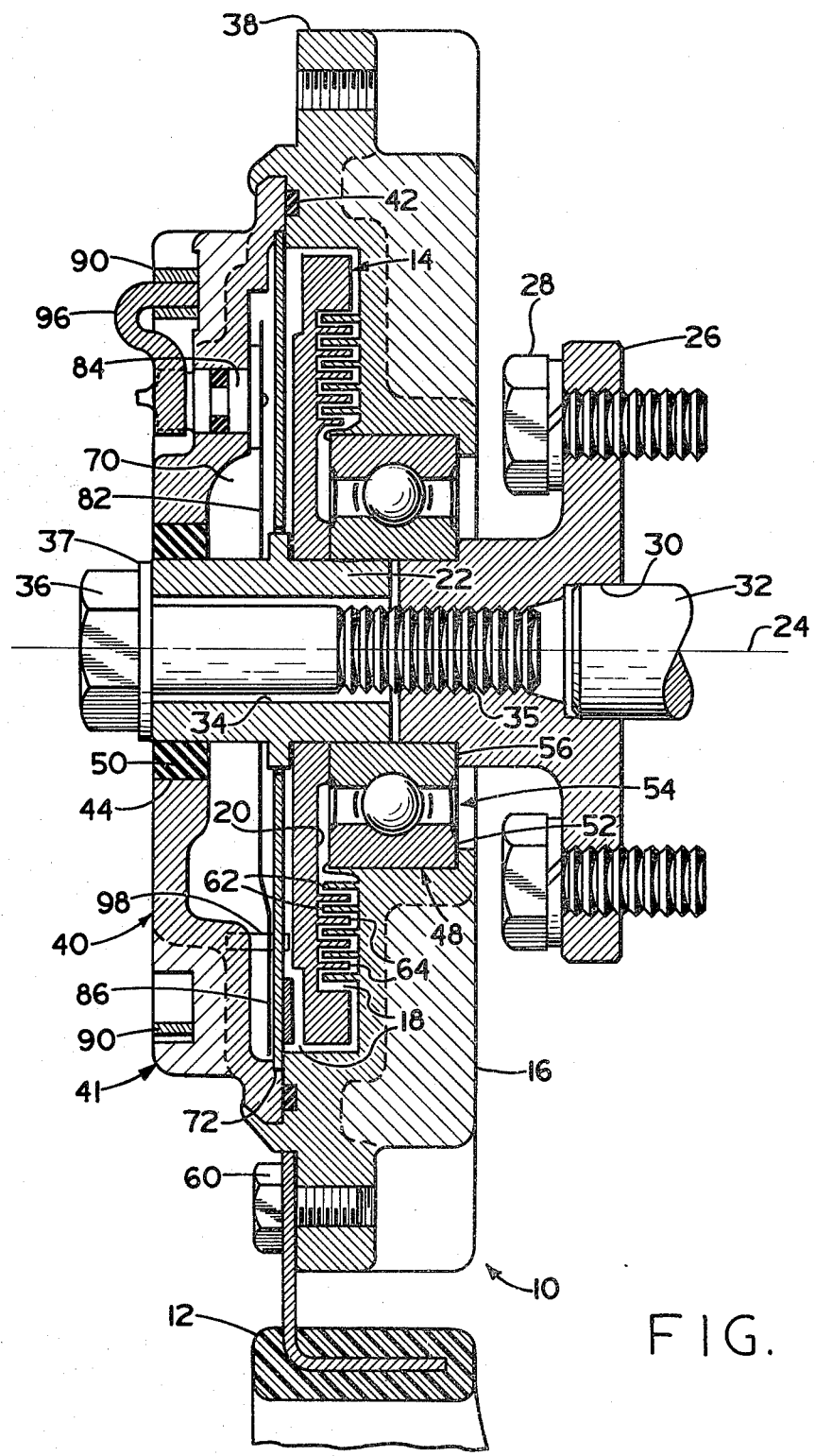
FIG. 2 is a sectional view of the torque transmitting device of the present invention taken approximately along the lines 2—2 of FIG. 1.

As representing one preferred embodiment of the invention, a fluid coupling 10 is disclosed in FIGS. 1 and 2 for driving a fan 12 from the water pump, not illustrated, of a vehicle. The fluid coupling 10 includes relatively rotatable input and output members 14 and 16, respectively. The input coupling member 14 is driven from the water pump of the vehicle and when so driven, rotates in a working chamber 18 defined in the output coupling member 16. The input clutch member 14 comprises a radially extending portion 20 and a hub portion 22 which is located concentric to the axis of rotation 24 of the unit 10. The hub portion 22 extends axially on opposite sides of the radially extending portion 20 and is press fitted or connected in a suitable fashion to the radially extending portion 20 for rotation therewith.

The hub 22 is adapted to mate with a flange member 26. The flange 26 is operably connected by the bolts 28 to the flange of a water pump, not illustrated. The flange 26 includes an axially extending opening 30 which is adapted to receive the water pump shaft 32 therein. The flange 26 provides a mounting assembly to mount the torque transmitting unit 10 to the water pump of the vehicle and the axial opening 30 cooperates with the shaft 32 of the water pump to center the flange 26 coaxial to the axis of rotation 24 of the water pump shaft 32. Rotation of the flange 26 with the output shaft 32 of the water pump will cause the axially extending hub portion 22 and the radially extending portion 20 of the input member 14 to rotate therewith.

The present invention provides a quick and simple arrangement for connecting the torque transmitting assembly 10 to the output of a water pump and for removing the torque transmitting assembly 10 from the water pump. The hub portion 22 has an opening generally indicated at 34 disposed coaxial to the axis of rotation 24. The opening portion 34 is aligned with an axially extending opening 35 in the flange 26 which is threaded and adapted to receive the threaded fastener member or bolt 36 therein which secures the torque transmitting unit 10 to the flange 26 for rotation therewith. A washer 37 surrounds the head of the bolt 36 and prevents dirt and other debris from entering the hub portion 22.

Rotation of the input coupling member 14 transmits torque to the relatively rotatable output member 16 through a fluid shear medium, such as silicon fluid. The output coupling member 16 comprises a disc shaped plate member 38 and a plate like cover member 40 having a plurality of cooling fins 41 thereon. The cover member 40 and disc shaped member 38 are joined at their peripheries by any suitable connector means and are sealed by the seal 42 to prevent fluid leakage. The output member 16 cooperates with the input member 14 to form the working chamber 18 within which the silicon fluid is disposed. The cover member 40 and the plate member 38 include annular openings 44 and 48, respectively, at their central portions through which the axially extending hub 22 of the input coupling member 14 and bolt member 36 extend. The diameter of the opening 44 is greater than the corresponding outer diameter of the hub portion 22 to provide a clearance therebetween. A suitable commercially available seal 50 is secured in the opening 44 in the cover 40 to provide a fluid tight seal between the cover 40 and the hub portion 22. The centrally located opening 48 in the member 38 includes a bearing race 52 secured thereto. A suitable bearing 54 is disposed between the centrally located opening 48 in the member 38 and the hub portion 22. The bearing 54 includes an inner bearing race 56 which is secured to the hub portion 22 of the input member 14 for rotation therewith. The bearing 54 provides for relative rotation of the input coupling member 14 and the output coupling member 16.

A fan blade assembly 12 is secured by bolts 60 to the member 38 for rotation therewith. The fan blades 12 will operate to draw air thru the radiator of the vehicle in a well known manner upon rotation of the output coupling member 16.

The member 38 of the driven coupling member 16 includes a plurality of concentric annular coupling lands 62 which are disposed in the operating chamber 18. The radially extending portion 20 of the driving coupling member 14 also includes a plurality of annular concentric coupling heads 64. The annular lands 64 are positioned in an axially overlapping relationship with the annular coupling lands 62 of the driven clutch member 16 so that the grooves disposed between the lands of one of the members receives the lands of the other member and vice versa, to form the fluid operating chamber 18 disposed between the lands. The aforementioned coupling grooves are disposed in the position so that when oil or other viscous fluid means such as silicon oil is disposed between the lands 62, 64 torque can be transmitted from one member to the other by either viscous shear or hydromechanical coupling. The volume of fluid in the coupling chamber 18 controls the degree of coupling and relative rotation between the input member 14 and the output member 16. The operation of the alternating lands and grooves to couple the input member 14 and output member 16 is more fully disclosed in U.S. Pat. No. 3,055,473, which is incorporated herein by reference.

A pump plate 72 is connected to the output member 16 for rotation therewith. The pump plate 72 is an annular plate which is secured at the peripheral portion thereof between the cover member 40 and the member 38 of the output coupling member 16. The pump plate 72 cooperates with the inner surface of the cover member 40 to define a fluid reservoir 70 which supplies operating fluid to the operating chamber 18. The pump plate 72 includes a pair of fluid passageways 74 and 76 disposed therein. The fluid passageway 74 preferably provides for fluid flow from the reservoir 70 to the operating chamber 18 and the fluid passageway 76 preferably provides fluid flow from the operating chamber 18 to the fluid reservoir 70. A wiper 80 is secured to the pump plate 72 for rotation therewith adjacent the fluid passageway 76. The wiper arm 80 operates as a pump mechanism as it rotates through the operating chamber 18 to pump operating fluid from the chamber 18 to the reservoir 70.

A valve member 82 is pivotably secured to the cover member 40 by a valve shaft 84. The valve shaft is suitably secured to the cover member 40 and provides a pivot point about which the valve member 82 may pivot. The valve member 82 includes a valve arm 84 having a valve face 86 at one end thereof. The valve face 86 extends in an overlapping relationship as is more fully illustrated in FIG. 1, relative to the fluid passageway 74 in the pump plate 72. The valve face 86 when in its position illustrated in FIG. 1, blocks fluid flow through the fluid passageway 74 from the reservoir 70 to the operating chamber 18. The valve member 82 is adapted to be rotated about the valve shaft 84 to uncover fluid passageway 74 and cover the fluid passageway 76 to selectively control the fluid flow from the reservoir 70 to the operating chamber 18 through the fluid passageway 74 and the fluid flow from the operating chamber 18 to the reservoir 70 through the fluid passageway 76.

A thermostatic ring 90 is secured to the cover member at one end thereof for rotation therewith by a retainer 92. The opposite end of the thermostatic element 90 is connected to the valve shaft 84 by the connector 96. The thermostatic ring 90 is adapted to be responsive to the ambient temperature of the air passing over the torque transmitting unit 10. Changes in the ambient temperature of the unit will effect expansion or contraction of the thermostatic ring 90. Expansion and contraction of the thermostatic ring 90 will effect pivoting movement of the valve shaft 84 to which the thermostatic ring 90 is connected. Pivoting movement of the valve shaft 84 will effect pivotal movement of the valve member 82 about the valve shaft 84 thereby changing the relationship of the valve face 86 and the fluid passageways 74 and 76.

In the present embodiment, the thermostatic ring 90 is composed of a bimetallic material which causes the ring to contract as the temperature sensed thereby increases. Contraction of the thermostatic ring 90 will effect a counterclockwise pivoting movement of the valve member 82 about the valve shaft 84. Counterclockwise movement of the valve member 82 from its position illustrated in FIG. 1 will cause the valve face 86 to move in a counterclockwise direction as illustrated in FIG. 1 to uncover the fluid passageway 74 and cover fluid passageway 76 and provide for an increase in fluid flow from the reservoir 70 to the operating chamber 18 through passageway 74 and a decrease in fluid flow from the operating chamber 18 to the reservoir 70 through the fluid passageway 76. An index pin 98 is disposed on the cover 40 and is utilized to set the position of the valve 82 when the unit is at a predetermined operating temperature. Index pin 98 limits clockwise rotation of the valve member as viewed in FIG. 1 and provides the initial set point for setting the valve member 82 and thermostatic ring 90. The length or circumference of the thermostatic ring 90 is chosen to provide the proper pivoting movement of the valve member 82 upon a predetermined change in the ambient temperature of the device 10. Since thermostatic ring 90 is a bimetalic element, expansion or contraction of the element will cause a predetermined pivoting movement of the valve member 82 upon a predetermined temperature change as sensed by the thermostatic ring 90.

When the unit is in operation, fluid will flow through the passageway 74 from the reservoir 70 to the operating chamber 18 when the thermostatic ring 90 causes the valve member 82 to unblock the fluid passageway 74. Rotation of the unit will cause fluid to be discharged from the operating chamber 18 to the reservoir 70 due to rotation of the wiper arm 80 on the pump plate 72. Because of the circumferential disposition of the wiper arm 80, fluid is pumped ahead of the wiper arm 80 as it rotates through operating chamber 18 creating a higher fluid pressure adjacent the fluid passageway 76, thus causing a fluid flow from the operating chamber 18, through the fluid passageway 76, to the reservoir 70.

The area of the fluid passageway 76 is less than the area of the inlet fluid passageway 74. Therefore, generally, the inlet rate of fluid flow into passageway 74 and operating chamber 18 is greater than the discharge rate of fluid flow from the operating chamber 18 through the passageway 76 to the reservoir 70. When the air temperature or ambient temperature surrounding the bimetallic thermostatic ring 90 is raised or lowered, the bimetallic element will either contract or expand, depending upon whether the temperature increases or decreases. Such expansion or contraction of the thermostatic element 90 results in appropriate rotation of the valve shaft 84 and angular movement of the valve member 82 to either open or close fluid inlet 74 and respectively close or open fluid passageway 76. The movement of the valve member 82 thus controls the volume of fluid in the operating chamber 18 and hence the degree of coupling between the input member 14 and the output member 16. As the temperature of the unit increases, fluid passageway 74 will be opened by movement of valve member 82 and fluid passageway 76 will be restricted. This will cause a net increase in the volume of operating fluid in operating chamber 18 and thus an increase in the degree of coupling between input 14 and output 16. As the temperature of the unit decreases, fluid passageway 74 will be restricted by movement of valve member 82 and fluid passageway 76 will be opened to cause a net decrease in the volume of operating fluid in operating chamber 18 and thus decrease the degree of coupling between input 14 and output 16. The operation of a similar coupling is more fully disclosed in U.S. Pat. No. 3,055,473.

While the present coupling has been described as including an inlet passageway 74 to the operating chamber 18 from the reservoir 70 and an outlet passageway 76 from the operating chamber 18 to the fluid reservoir 70, it should be realized that the function of the passageways could be reversed. For example, the passageway 74 could be utilized as the exit passageway from the operating chamber 18 and the passageway 76 could be utilized as the inlet passageway to the operating chamber. Also, while two passageways have been provided it would be possible to design the present unit so that only a single passageway would be utilized for the inlet and outlet and the valve member 82 would control the fluid flow through the single passageway. The valve member 82 has been disclosed as including a valve face 86 which controls fluid flow through both passageways 74 and 76. However, it is possible to use the valve member 82 to only control the fluid flow through passageway 74 by sizing the opening 76 so that it always is in an unblocked position. In this manner the passageway 76 may have a smaller diameter than the passageway 74 so that the correct value of operating fluid remains in operating chamber 18 as the valve member 82 is rotated in response to changes in the ambient temperatures of the device 10. When the valve 82 only controls fluid flow into operating chamber 18, the fluid flow through passageway 74 will be dependent on the position of valve face 86 and the fluid flow from operating chamber 18 will be dependent upon the speed of rotation of the wiper arm 80 with the pump plate 72. Thus, by varying the position of the valve face 86, the net volume of operating fluid in chamber 18 can be controlled.

Rotation of the cover member 40 and the thermostatic ring 90 attached thereto subjects the thermostatic ring to centrifugal forces which tend to cause undesirable expansion of the thermostatic ring 90 which is not related to the temperature of the ring. To alleviate this problem, counterbalancing means is provided to counterbalance the centrifugal forces acting on the thermostatic ring 90. To this end, a counterweight 100 is attached to the valve member 82. The counterweight 100 is located on the valve member 82 intermediate the valve shaft 84 and the valve face 86 and is subjected to centrifugal forces caused by the rotation of the valve member 82 with the cover 40. The centrifugal forces acting on the counterweight 100 will tend to cause the valve arm 82 to rotate about the valve shaft 84 in a counterclockwise direction. However, the centrifugal forces acting on the thermostatic ring 90 will tend to cause the thermostatic ring 90 to try to rotate the valve member 82 in a clockwise direction. The counterweight 100 and the thermostatic ring 90 rotate at the same speed as the output member 16 to which they are attached and the mass of the counterweight 100 is chosen so it counterbalances the centrifugal forces acting on the thermostatic ring 90. Thus, movement of the thermostatic ring 90 and movement of the valve member 82 attached thereto occurs as a result of the ambient temperature sensed by the thermostatic element 90 and not as a result of the centrifugal forces acting thereon.

It should be apparent that the present coupling 10 is adapted to be easily connected and disconnected from a water pump of a vehicle by a single bolt 36. This provides for efficient mounting and removal of the fan drive of the present invention. The use of the thermostatic ring allows a through bolt 36 which is disposed coaxial to the axis of rotation of the unit 10 to be utilized to mount the unit to the water pump. Additionally, the use of the thermostatic ring disposed on the exterior of the unit 10 allows the coupling 10 to sense the temperature of the ambient air. The temperature of the ambient air surrounding the coupling 10 is directly related to the temperature of the water in the radiator as the unit 10 draws air thru the radiator to effect efficient cooling thereof. This is a distinct advantage over units which utilize a thermostatic element which is mounted interiorly of the torque transmitting unit. In such a case the temperature responsive element is not subjected to the ambient air and merely varies the setting of the valve in response to the internal temperature of the torque transmitting mechanism. It has been found that the internal temperature of the torque transmitting mechanism is not directly related to the temperature of the water in the radiator. Hence, the present unit provides for simple mounting with a single bolt while utilizing a temperature responsive element which is sensitive to the ambient temperature of the torque transmitting unit. It is assumed that the ambient temperature of the torque transmitting unit sensed by the thermostatic ring 90 is the same as the ambient temperature of the air surrounding the unit.

From the foregoing it should be apparent that a new and an improved torque transmitting device has been provided. The torque transmitting device as described includes a first member defining an operating chamber therein and a second member disposed within the operating chamber which is rotatable relative to the first member about an axis of rotation. A fluid reservoir is provided in the unit and a fluid passageway communicates with the fluid reservoir and the operating chamber. Valve means is provided for controlling the fluid flow through the fluid passageway to effect selective communication between the fluid reservoir and the operating chamber. A fluid means is disposed in the reservoir and selectively displaceable into the operating chamber through the fluid passageway whereby fluid is positioned in the operating chamber to transmit energy through the fluid from one of the members to the other. A thermostatic ring is connected to the valve member and controls the position of the valve member in response to the ambient temperature of the air of the torque transmitting device to control the volume of fluid in the operating chamber. A through bolt is disposed coaxial to the axis of rotation for mounting the unit to an output shaft of a vehicle and counterbalancing means are provided to counterbalance the centrifugal force acting on the thermostatic ring upon rotation thereof.

What I claim is:

1. A torque transmitting device adapted to transmit torque from an input comprising a first member defining an operating chamber therein, a second member disposed within said operating chamber and rotatable relative to said first member about an axis of rotation, a fluid reservoir, a fluid passageway connectable with said fluid reservoir and said operating chamber, pivotable valve means for controlling the fluid flow through said fluid passageway to effect selective communication between said fluid reservoir and said operating chamber, fluid means disposed in said reservoir and selectively displaceable into said operating chamber through said fluid passageway whereby fluid is positioned in said operating chamber to transmit energy through said fluid from one of said members to the other, a thermostatic ring having one end connected to said first member and responsive to the ambient temperature of the torque transmitting device and having its opposite end connected to said valve means for controlling the position of said valve means and the volume of said fluid means in said operating chamber in response to the ambient temperature of the torque transmitting device, said ring being radially spaced apart from said axis of rotation and being disposed substantially coaxial to said axis of rotation, said opposite end of said ring being connected to said valve member to pivot said valve member about a pivot point which is radially spaced apart from said axis of rotation to control the fluid flow through said fluid passageway, and fastener means for connecting one of said first and second members to the input to effect relative rotation of said first and second members, said fastening means being disposed substantially coaxial to said axis of rotation.

2. A torque transmitting device adapted to transmit torque from an input comprising a first member defining an operating chamber therein, a second member disposed within said operating chamber and rotatable relative to said first member about an axis of rotation, a fluid reservoir, a fluid passageway communicating with said fluid reservoir and said operating chamber, valve means for controlling the fluid flow through said fluid passageway to effect selective communication between said fluid reservoir and said operating chamber, fluid means disposed in said reservoir and selectively displaceable into said operating chamber through said fluid passageway whereby fluid is positioned in said operating chamber to transmit energy from the input through said fluid from one of said members to the other, a thermostatic ring connected to said valve means for controlling the position of said valve means and the volume of said fluid means in said operating chamber in response to the ambient temperature of the torque transmitting device, the center of said thermostatic being disposed substantially coaxial to said axis of rotation, and fastener means extending through said first and second members for connecting one of said members to the input for driving said one member to effect relative rotation of said first and second members, said fastening means being disposed substantially coaxial to said axis of rotation.

3. A torque transmitting device as defined in claim 2 wherein said valve means includes a valve member having a first end and a second end, said valve member being pivotally supported about a pivot point disposed intermediate said first and second ends, said thermostatic ring having a first end thereof connected to one of said members and a second end thereof connected to said first end of said valve member for effecting movement of said valve member about said pivot point in response to expansion or contraction of said thermostatic ring in response to changes in the ambient temperature of the torque transmitting device, said second end of said valve member controlling the fluid flow through said fluid passageway and being movable by said thermostatic ring to position the second end of said valve member in response to the ambient temperature of the torque transmitting device.

4. A torque transmitting device as defined in claim 3 wherein the distance between said first end of said valve member and said pivot point is less than the distance between said second end of said valve member and said pivot point to enable a small movement of said first end of said valve member by said thermostatic ring to effect a greater movement of said second end of said valve member.

5. A torque transmitting device adapted to transmit torque from an input comprising a first member defining an operating chamber therein, a second member disposed within said operating chamber and rotatable relative to said first member about an axis of rotation, a fluid reservoir, a fluid passageway communicating with said fluid reservoir and said operating chamber, valve means for controlling the fluid flow through said fluid passageway to effect selective communication between said fluid reservoir and said operating chamber, fluid means disposed in said reservoir and selectively displaceable into said operating chamber through said fluid passageway whereby fluid is positioned in said operating chamber to transmit energy from the input through said fluid from one of said members to the other, a thermostatic ring connected to said valve means for controlling the position of said valve means and the volume of said fluid means in said operating chamber in response to the ambient temperature of the torque transmitting device, the center of said thermostatic ring being disposed substantially coaxial to said axis of rotation, and fastener means for connecting one of said members to the input for driving said one member to effect relative rotation of said first and second members, said fastener means being disposed substantially coaxial to said axis of rotation and wherein said fastener means is a bolt member which extends through said first and second members substantially coaxial to said axis of rotation.

6. A torque transmitting device as defined in claim 5 further including counterbalancing means rotatable about said axis of rotation and responsive to centrifugal force acting thereon, said thermostatic ring being rotatable about said axis of rotation and being subjected to centrifugal force acting thereon, said counterbalancing means upon rotation thereof acting to counterbalance the centrifugal forces acting on said thermostatic ring upon rotation thereof.

7. A torque transmitting device adapted to transmit torque from an input comprising a first member defining an operating chamber therein, a second member disposed within said operating chamber and rotatable relative to said first member about an axis of rotation, a fluid reservoir, a fluid passageway communicating with said fluid reservoir in said operating chamber, valve means for controlling the fluid flow through said fluid passageway to effect selective communication between said fluid reservoir and said operating chamber, fluid means disposed in said reservoir and selectively displaceable into said operating chamber through said fluid passageway whereby fluid is positioned in said operating chamber to transmit energy from the input through said fluid from one of said members to the other, a thermostatic ring connected to said valve means for controlling the position of said valve means and the volume of said fluid means in said operating chamber in response to the ambient temperature of the torque transmitting device, and fastener means for connecting one of said members to the input for driving said one member to effect relative rotation of said first and second members, said fastener means being disposed substantially coaxial to said axis of rotation, said fastener means being a bolt member which extends through said first and second members substantially coaxial to said axis of rotation.

8. A torque transmitting device adapted to transmit torque from an input comprising a first member defining an operating chamber therein, a second member disposed within said operating chamber and rotatable relative to said first member about an axis of rotation, a fluid reservoir, a fluid passageway communicating with said fluid reservoir and said operating chamber, valve means for controlling the fluid flow to said fluid passageway to effect selective communication between said fluid reservoir and said operating chamber, fluid means disposed in said fluid reservoir and selectively displaceable into said operating chamber through said fluid passageway whereby fluid is positioned in said operating chamber to transmit energy from the input through said fluid from one of said members to the other, a thermostatic ring connected to said valve means for controlling position of said valve means and the volume of said fluid means in said operating chamber in response to the ambient temperature of the torque transmitting device, and counterbalancing means rotatable about said axis of rotation and responsive to centrifugal force acting thereon, said thermostatic ring being rotatable about said axis of rotation and being subject to centrifugal force acting thereon, said counterbalancing means acting to counterbalance the centrifugal forces acting on said thermostatic ring upon rotation thereof.

9. A torque transmitting device as defined in claim 8 wherein said valve means includes a valve member having a first end and a second end, said valve member being pivotally supported about a pivot point disposed intermediate the said first and second ends, said thermostatic ring having a first end thereof connected to one of said members and a second end thereof connected to said first end of said valve member for effecting movement of said valve member about said pivot point in response to expansion or contraction of said thermostatic ring in response to changes in the ambient temperature of the torque transmitting device, said second end of said valve member controlling the fluid flow through said fluid passageway and being movable by said thermostatic ring to position the second end of said valve member in response to the ambient temperature of the torque transmitting device.

10. A torque transmitting device as defined in claim 9 wherein said counterbalancing means acts on said valve member intermediate said pivot point and said second end of said valve member.

11. A torque transmitting device as defined in claim 10 further including second fluid passageway means for directing fluid from said operating chamber to said fluid reservoir and pump means effective to pump fluid from said operating chamber to said fluid reservoir through said second fluid passageway.

12. A torque transmitting device as defined in claim 9 wherein the distance between said first end of said valve member and said pivot point is less than the distance between said second end of said valve member and said pivot point to enable a small movement of said first end of said valve member by said thermostatic ring to effect a greater movement of said second end of said valve member.

13. A torque transmitting device adapted to transmit torque from an input comprising a first member defining an operating chamber therein, a second member disposed within said operating chamber and rotatable relative to said first member about an axis of rotation, a fluid reservoir, a fluid passageway connectable with said fluid reservoir and said operating chamber, valve means for controlling the fluid flow through the said fluid passageway to effect selective communication between said fluid reservoir and said operating chamber, fluid means disposed in said reservoir and selectively displaceable into said operating chamber through said fluid passageway whereby fluid is positioned in said operating chamber to transmit energy through said fluid from one of said members to the other, a thermostatic element responsive to the ambient temperature of the torque transmitting device and connected to said valve means for controlling the position of said valve means and the volume of said fluid means in said operating chamber in response to the ambient temperature of the torque transmitting device, fastener means for connecting one of said first and second members to the input to effect relative rotation of said first and second members, said fastener means being disposed substantially coaxial to said axis of rotation, said fastener means being a bolt member which extends through said first and second members substantially coaxial to said axis of rotation, and counterbalancing means rotatable about said axis of rotation and responsive to centrifugal force acting thereon, said thermostatic element being supported on one of said members for rotation about said axis of rotation and being subjected to centrifugal force acting thereon upon rotation thereof, said counterbalancing means upon rotation thereof acting to counterbalance the centrifugal force acting on said thermostatic element upon rotation thereof.

14. A torque transmitting device as defined in claim 13 wherein said valve means includes a valve member having a first end and a second end, such valve member being pivotally supported about a pivot point disposed intermediate said first and second ends, said thermostatic element having a first end thereof connected to one of such members and a second end thereof connected to said first end of said valve member for effecting movement of said valve member about said pivot point in response to expansion or contraction of said thermostatic element in response to changes in the ambient temperature of the torque transmitting device, said second end of said valve member controlling the fluid flow through said fluid passageway and being movable by said thermostatic element to position the second end of said valve member in response to the ambient temperature of the torque transmitting device.

15. A torque transmitting device as defined in claim 14 wherein said counterbalancing means acts on said valve member intermediate said pivot point and said second end of said valve member to counterbalance the centrifugal forces acting on said thermostatic element.

16. A torque transmitting device as defined in claim 15 further including second fluid passageway means for directing fluid from said operating chamber to said fluid reservoir and pump means effective to pump fluid from said operating chamber to said fluid reservoir through said second fluid passageway means.

17. A torque transmitting device as defined in claim 14 wherein the distance between said first end of said valve member and said pivot point is less than the distance between said pivot point and said second end of said valve member to enable a small movement of said first end of said valve member by said thermostatic element to effect a greater movement of said second end of said valve member.

18. An engine fan drive adapted to be connected to a shaft driven by an engine comprising a driving clutch member connectable to the shaft for rotation therewith about an axis of rotation, a driven clutch member rotatable relative to said driving clutch member and driven thereby about said axis of rotation, fan means connected to rotate with said driven member, an operating chamber, a fluid reservoir, operating fluid in said fluid reservoir selectively displaceable into said operating chamber, first and second fluid passageways connecting said operating chamber and said fluid reservoir, one of said fluid passageways adapted to direct operating fluid flow from said reservoir to said operating chamber and the other of said fluid passageways adapted to direct the operating fluid flow from said operating chamber to said fluid reservoir, valve means for controlling the operating fluid flow through one of said fluid passageways to effect the selective flow of operating fluid between said fluid reservoir and said operating chamber, pump means effective to pump said operating fluid between said fluid reservoir and said operating chamber through the other of said passageways, a thermostatic ring for controlling the position of said valve means in response to the ambient temperature of the engine fan drive to control the fluid flow through said one fluid passageway to control the volume of fluid in said operating chamber, said thermostatic ring having a center disposed substantially coaxial to said axis of rotation, said operating fluid transmitting energy through said fluid from said driving clutch member to said driven clutch member, said driving clutch member and said driven clutch member each including an opening therein disposed coaxial to said axis of rotation and bolt means having a longitudinal axis coaxial to said axis of rotation and extending through said opening in each of said driving and driven members for supporting said driving and driven members on the shaft driven by the engine.

19. An engine fan drive as defined in claim 18 further including counterbalancing means rotatable about said axis of rotation and responsive to centrifugal force acting thereon, said thermostatic ring being rotatable about said axis of rotation and being subject to centrifugal force acting thereon, said counterbalancing means acting to counterbalance the centrifugal forces acting on said thermostatic ring upon rotation thereof.

20. An engine fan drive as defined in claim 19 wherein said valve means includes a valve member having a first end and a second end and a valve shaft supported on said driven member for rotation therewith, said valve member being pivotably supported on said valve shaft intermediate said first and second ends, said thermostatic ring having a first end connected to such driven member for supporting said thermostatic ring for rotation with said driven member and a second end connected to said first end of said valve member for effecting movement of such valve member about said valve shaft in response to expansion or contraction of said thermostatic ring in response to changes in the ambient temperatures of the fan drive, said second end of said valve member controlling the fluid flow through said one fluid passageway and being movable by said thermostatic ring to position the second end of said valve member in response to the ambient temperature of the torque transmitting device.

21. A torque transmitting device adapted to transmit torque from an input comprising a first member defining an operating chamber therein, a second member disposed within said operating chamber and rotatable relative to said first member about an axis of rotation, a fluid reservoir, a fluid passageway connectable with said fluid reservoir and said operating chamber, valve means for controlling the fluid flow through said fluid passageway to effect selective communication between said fluid reservoir and said operating chamber, fluid means disposed in said reservoir and selectively displaceable into said operating chamber through said fluid passageway whereby fluid is positioned in said operating chamber to transmit energy through said fluid from one of said members to the other, a thermostatic ring responsive to the ambient temperature of the torque transmitting device and connected to said valve means for controlling the position of said valve means and the volume of said fluid means in said operating chamber in response to the ambient temperature of the torque transmitting device, and fastening means for connecting one of said first and second members to the input to effect relative rotation of said first and second members, said fastening means being a bolt member which extends through said first and second members substantially coaxial to said axis of rotation.

* * * * *